United States Patent [19]

Taylor

[11] Patent Number: 4,946,215
[45] Date of Patent: Aug. 7, 1990

[54] STORAGE DEVICE FOR A PICKUP TRUCK BED

[76] Inventor: Clyde Taylor, 8555 Newsom Sta. Rd., Nashville, Tenn. 37221

[21] Appl. No.: 250,327
[22] Filed: Sep. 28, 1988
[51] Int. Cl.⁵ .............................................. B60R 9/00
[52] U.S. Cl. ................................. 296/37.6; 296/37.1; 224/273; 224/42.42; 312/DIG. 33
[58] Field of Search ............................ 296/37.1, 37.6; 224/42.42 R, 42.45 R, 273; 312/DIG. 33; 206/335

[56] References Cited
U.S. PATENT DOCUMENTS

| | | | |
|---|---|---|---|
| 1,665,642 | 4/1928 | Sankey | 224/42.42 R |
| 2,874,885 | 2/1959 | Young | 224/42.42 R |
| 3,265,261 | 8/1966 | Kenrick et al. | 224/273 |
| 3,640,423 | 2/1972 | Parker et al. | 296/37.6 X |
| 4,247,026 | 1/1981 | Heifner et al. | 224/42.42 R |
| 4,288,011 | 4/1981 | Grossman | 296/37.6 X |
| 4,531,775 | 7/1985 | Beals | 296/37.6 X |
| 4,635,992 | 1/1987 | Hamilton et al. | 296/37.6 |
| 4,718,583 | 1/1988 | Mullican | 296/37.6 X |
| 4,728,017 | 3/1988 | Mullican | 296/37.6 X |
| 4,778,213 | 10/1988 | Palmer | 296/37.6 X |

Primary Examiner—Charles A. Marmor
Assistant Examiner—Brian Johnson
Attorney, Agent, or Firm—Harrington A. Lackey

[57] ABSTRACT

The storage device is a device used in pickup truck beds, for the purpose of protecting items from the outside elements. The two main elements are the compartment, and the lid. The compartment and lid are made of materials such as sturdy lightweight injection molded plastics. The lid is ribbed across the top to add strength. The capacity of the compartment is approximately the same as the trunk of most small to medium size cars. It has a metal security tube system with locks, and rubber boot suction cups in the front and back of the device, to prevent theft or unauthorized removal from the bed. The lid has a front end locking mechanism that secures the contents. The lid is hinged at the rear end, allowing the lid to be opened and closed, from the tailgate area of the truck bed. A metal rod in the lid, allows the lid element to be raised to various positions (openings) as desired, when putting items into or taking items out of the compartment. The storage device is a portable device.

10 Claims, 7 Drawing Sheets

STORAGE DEVICE FOR A PICKUP TRUCK BED

BACKGROUND OF THE INVENTION

1. Field of the Invention

The invention relates generally to storage devices that are installed in the bed of pickup truck vehicles to transport given items, in such a manner as to protect those items from outside elements.

2. Description of the Prior Art

A problem with owning a pickup truck concerns protected storage space, such as, an automobile's trunk area provides. Campers, toppers, tool boxes, and the like are either permanently attached or loose in the truck bed. Permanent structures reduce the flexibility and use of the truck bed. Some devices merely sit in the truck bed, and can be removed at will, but offer no security for the contents, and are easily stolen. The storage device made in accordance with this invention solves the problem of unlimited use of the truck bed through portability. It can be removed easily and is of lightweight construction. Yet, it offers a security system permitting only authorized removal from the truck bed. All prior art researched reveals no such product exists.

SUMMARY OF THE INVENTION

The invention relates to a device used to store and transport items in the bed of pickup trucks. It comprises a compartment and lid articulated by a hinge on one end and a lock on the other providing security for the contents stored within. The storage device is secured to the pickup truck bed by means of a security system to prevent theft.

It is an object of the invention to provide a device that is portable yet secured in the truck bed; lightweight, yet sturdily constructed; easily packed and unpacked, yet locks, for protecting one's property; and designed to fit most all pickup truck beds. This invention relates to storage devices placed into the bed of a pickup truck, to conceal and protect items. The principal object of the invention is to provide security and protection from outside elements. Another object is the ease of entry for the user of the invention when removing items or placing items into the device. Other objects and advantages reside in the device's portability and lightweight construction. The practical utility of the device will become apparent through the following description.

BRIEF DESCRIPTION OF THE DRAWINGS

FIG. 9-A is a front elevational view of the storage device disclosing the lid in a closed position and also in an open position;

FIG. 9-B is an end elevation of the storage device with the lid disclosed in a partially open position and the rod positioners in various adjusted phantom positions;

FIG. 11-A is a cross-sectional view of the mechanical locking assembly and the outside handle assembly;

FIG. 12-A is an end elevational view of the front end locking mechanism, with the metal arm shown in section;

FIG. 13-A is an enlarged front elevational view of the slide bearing disclosed in FIG. 13 with the lock rod shown fragmentarily;

FIG. 13-B is an enlarged fragmentary sectional elevation of the slide bearing and setscrew member;

FIG. 14-A is an enlarged fragmentary cross-section of the hinge mounting secured to the lid and the compartment, shown fragmentarily, and an exploded view of the securing bolt mechanism;

FIG. 15-A is a fragmentary side view of the handle disclosed in FIG. 15; and

FIG. 15-B is a fragmentary end elevational view of the handle disclosed in FIG. 15.

DESCRIPTION OF THE PREFERRED EMBODIMENTS

Referring to the drawings, the storage device made in accordance with this invention comprises a compartment or compartment element 16, and a lid or lid element 17, preferably fabricated of lightweight, injection molded plastics. The lid 17 articulates, at the rear end of the device, with compartment 16 by means of a hinge 18. The lid 17 and compartment 16 are secured to the hinge 18 by means of suitable bolts.

Figure 1:
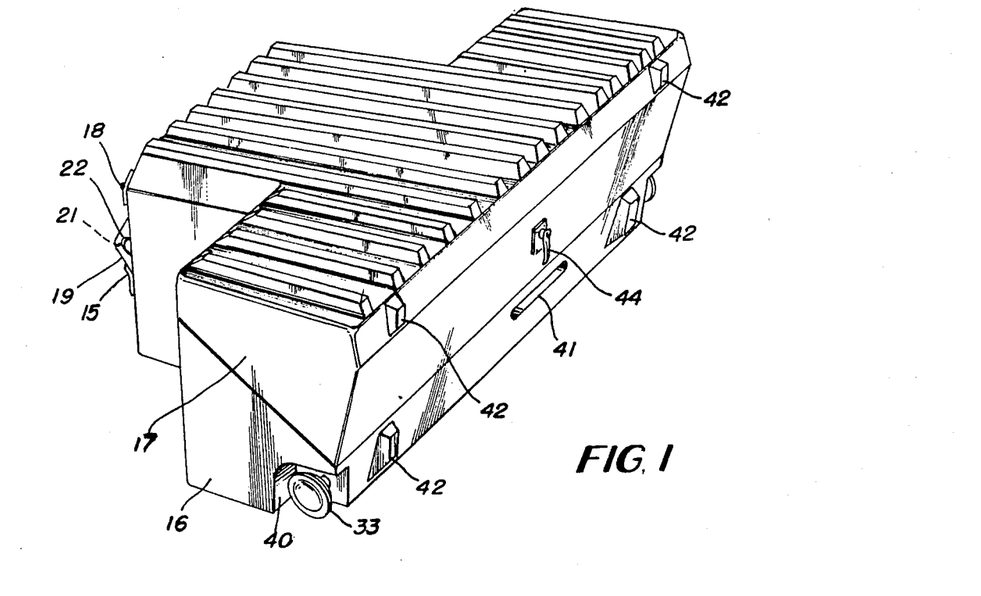
FIG. 1 is a top, front perspective view of the storage device made in accordance with this invention.
Figure 2:
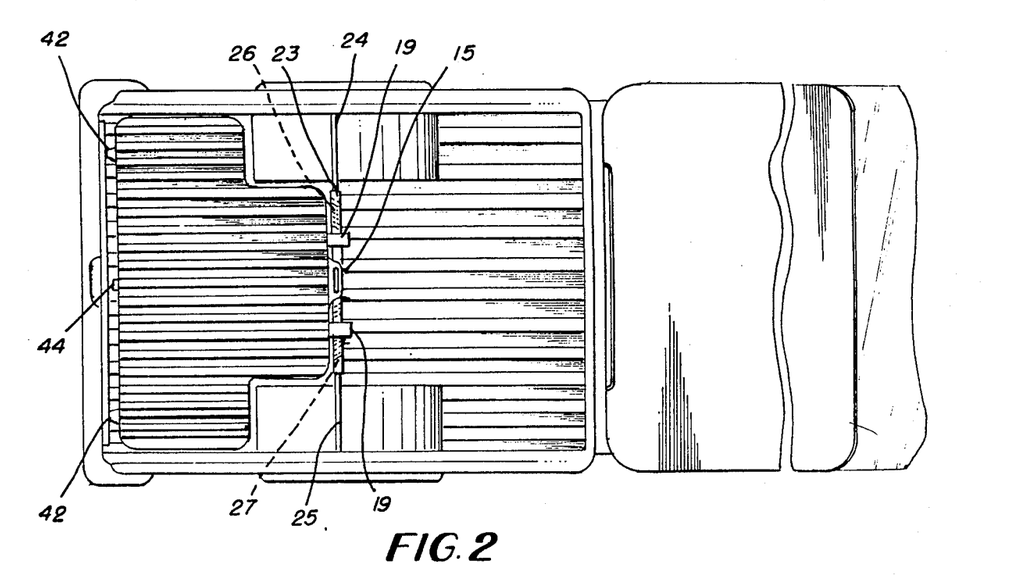
FIG. 2 is a plan view of the storage device received within the rear portion of the bed of a pickup truck, shown fragmentarily.
Figures 3, 4, 6:
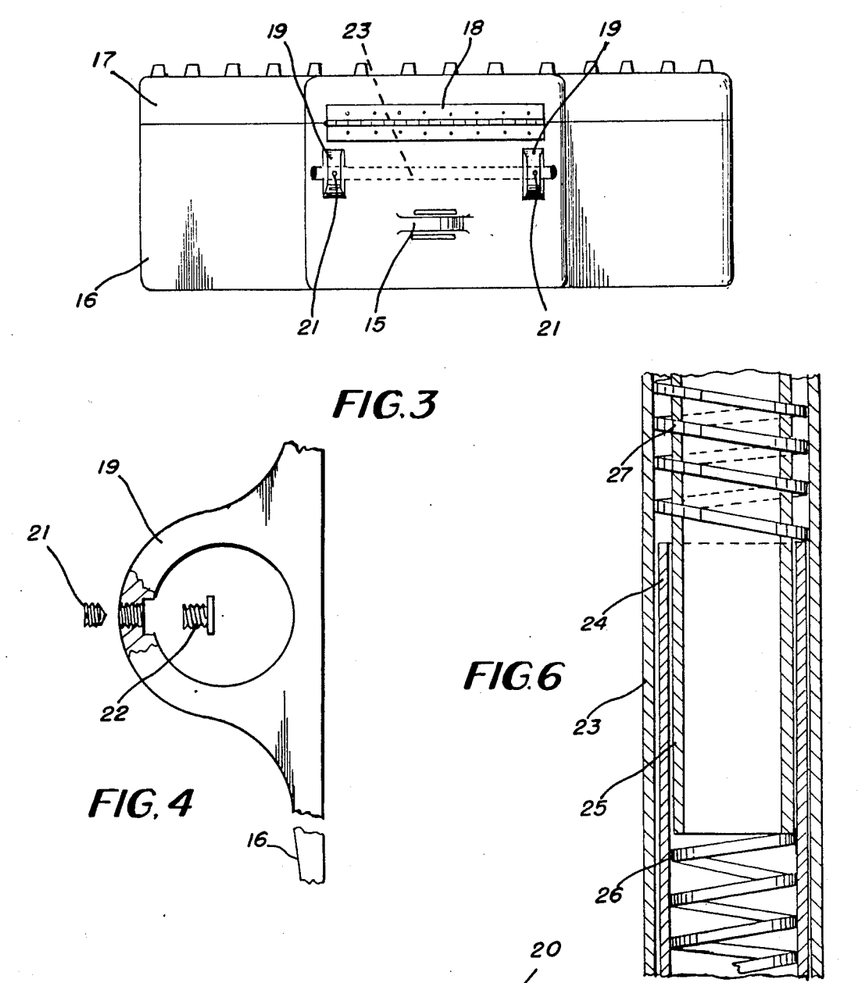
FIG. 3 is a rear view of the storage device.
FIG. 4 is a detail, fragmentary, enlarged cross-sectional view of the rear tube assembly, mounting element.
FIG. 6 is a detail, fragmentary, enlarged cross-sectional view of the rear end securing system.
Figure 5:
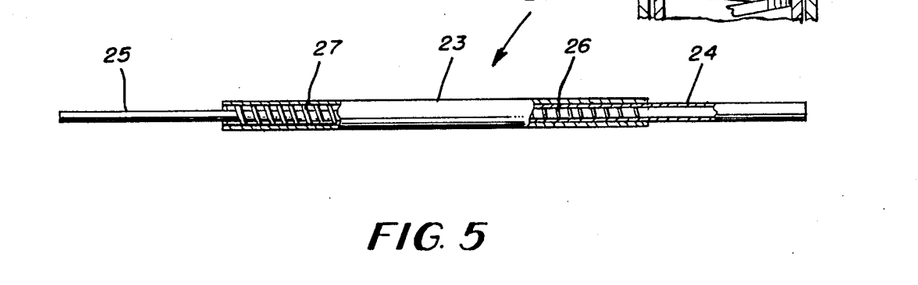
FIG. 5 is a longitudinal sectional elevation of the rear end securing system tubes.
Figure 7:
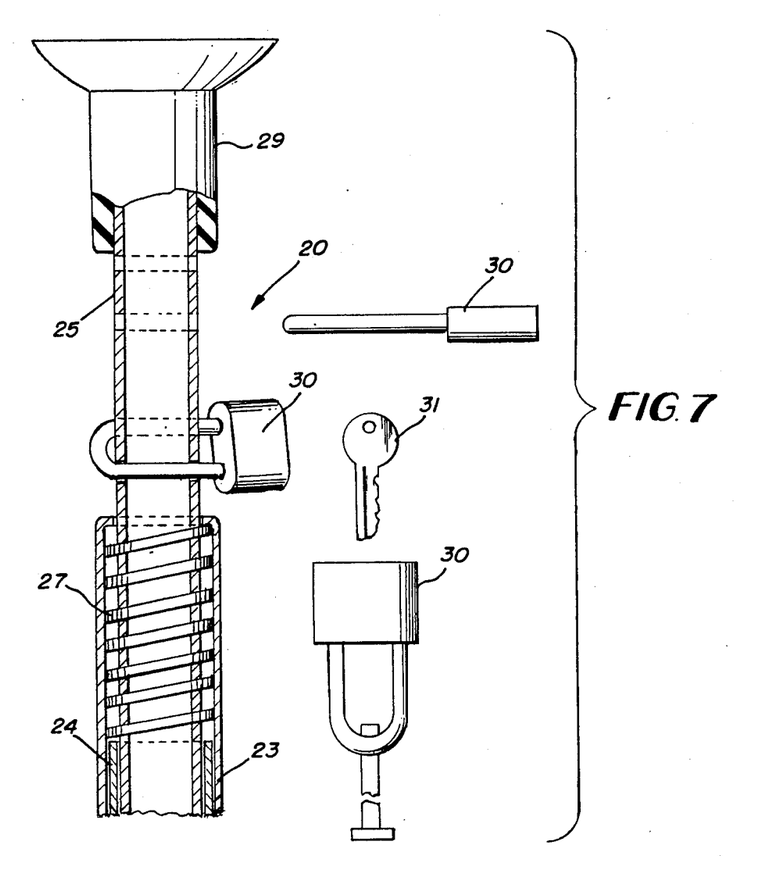
FIGS. 7 and 8 are detail fragmentary sectional elevations illustrating a construction for the rear end securing system.
Figure 8:
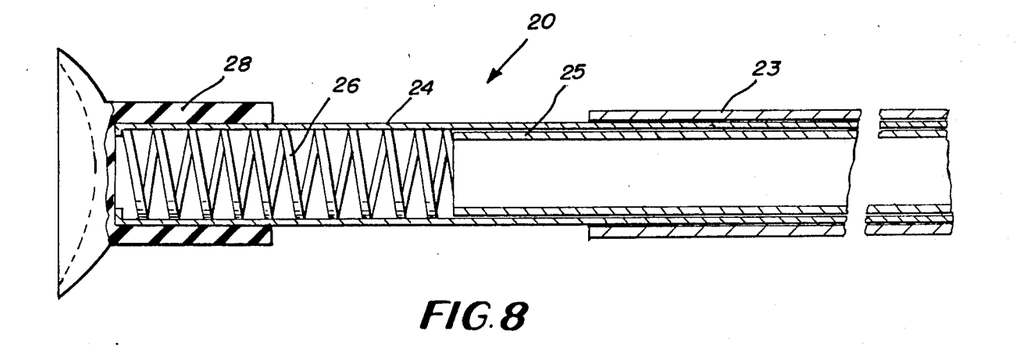

The rear securing means or rear tube assembly mounting elements 19, fabricated as part of the compartment 16, provides stability for the tubes of the rear end securing system 20 by means of a set screw 21 threaded into a metal sleeve 22 allowing pressure to be exerted onto the center or mounting tube 23 of the rear end securing system, holding it constantly in place. The rear end securing system comprises a center tube 23, a left tube or hollow lock shaft 24, and a right tube or hollow lock shaft 25 (when viewing the storage device in the truck bed from the tailgate angle). The rear end securing system also comprises a left spring 26 and a right spring 27. On the outermost left end of tube 24, is the rear rubber boot suction cup 28, and on the outermost left end of tube 24, is the rear rubber boot suction cup 28, and on the outermost right end of the tube 25 is the rear rubber boot suction cup 29. The rear end securing system spring 26 slides into the open end of tube 24 which is crimped at the outermost left end. Tube 25 is then slipped into the open end of center tube 23 and comes to rest at the right end of the center tube 23, which is also crimped. Tube 24 is then inserted into the leftmost open end of the center tube 23, until it comes to rest against spring 27. Springs 26 and 27 permit the rear end securing system tubes 24 and 25 to be expanded or reduced in length to accommodate a variety of pickup truck bed widths adding to the device's utility features. The rear rubber boot suction cups 28 and 29 are inserted over the leftmost end of the tube 24 and rightmost end of tube 25 respectively. Pressure from the springs 26 and 27 is exerted against the left and right pickup truck inner bed walls causing the rear rubber boot suction cups 28 and 29 to adhere to or grip the truck's inner bed walls. Rear end securing system tubes 24 and 25 have openings drilled vertically, perpendicular to the plane of the primary axis of the tubes. Tubes 24 and 25 have openings which begin slightly inward to the right of the boot part of the left rear rubber boot suction cup 28 and slightly inward to the left of the boot part of the right rear rubber boot suction cup 29, and each opening is equidistant to the other, the entire remainder of length of tubes 24 and 25.

To stabilize the rear end securing system 20 to the rear tube assembly mounting elements 19, which is best fabricated as part of, the whole of, the compartment 16, the rear end securing system 20 can be put through the outermost opening of either rear tube assembly mounting element 19 from the left or right sides of the device. As the rear end securing system 20 is placed through both rear tube assembly mounting elements 19 and centered using the centering marks provided, the vertical openings along the length of tubes 24 and 25 should be turned so all openings are also vertical and lined up. Earlier, prior to putting the rear end securing system 20 in place, the threaded sleeve 22 was inserted into the opening found at the rearmost point of the apex of the rear tube assembly mounting elements 19 and the set screws 21 were threaded in with a screwdriver to a point where the rear end securing system 20, including center tube 23 could pass through easily. With the rear end securing system 20 properly aligned, both set screws 21 on the rear tube assembly mounting elements 19 are tightened with a screwdriver until seated firmly.

The rear end securing system 20 comes with two padlocks 30, and two keys 31 for each padlock 30. The padlocks 30 are inserted in the openings in tubes 24 and 25 and when the device in being removed from or inserted into the pickup truck bed, from the tailgate angle, tubes 24 and 25 are pushed inwardly into center tube 23 and springs 26 and 27 are compressed maximally yet allowing the opening in the leftmost end of tube 24 to align with the left opening at the far left end of center tube 23. The padlock 30 is inserted into the aligned opening and locked. Similarly, an opening in the rightmost end of tube 25 is aligned with the opening at the right end of the center tube 23 by compressing spring 27 maximally while pushing the tube 25 inwardly toward the center tube 23. When the openings of tubes 23 and 25 become aligned, the padlock 30 is inserted and locked. This action permits the device to be placed into or removed from the pickup truck bed. A similar detailed description will follow regarding the action of the front end securing system 32.

To expand the rear end securing system 20 into the bed of the pickup truck, inner bed walls, the proper key 31 unlocks the padlocks 30 (all keys 31 provided fit both padlocks 30). Once unlocked, the padlocks 30 are removed one at a time with pressure exerted, by hand, to allow the gentle release of tension caused by the springs 26 and 27. The tubes 24 and/or 25 with the rubber boot suction cups 28 and/or 29 are released, by hand, slowly until the rubber boot suction cups 28 and 29 touch the inner wall of the bed of the pickup truck. Pressure is exerted on each tube 24 and/or 25, by hand, creating a suction on rubber boot suction cups 28 and 29. Upon completion of this action the storage device is centered in the pickup truck bed, with the centering marks provided; and the padlocks 30 are re-inserted into the opening nearest the center tube 23 but not necessarily into the openings at the far left and right of center tube 23. The closest opening to the center tube 23 of tubes 24 and/or 25 are best. This action allows for the variances in different makes and models of pickup truck bed widths.

Figure 15:
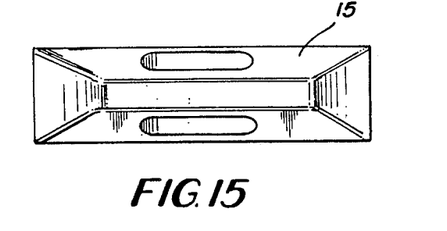
FIG. 15 is a plan view of the rear handle.
Figure 15A:
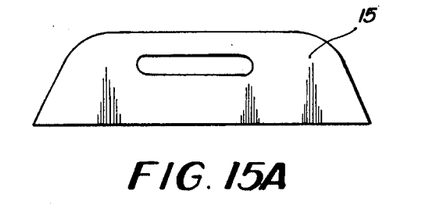
Figure 15B:
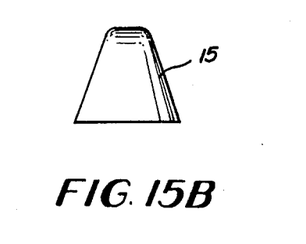

The handle 15, as viewed from various angles in FIGS. 15, 15-A and 15-B, is located on the rear end of the storage device, and is best fabricated as part of the whole of the compartment 16. The handle 15 is used to carry the device when removed from the pickup truck.

Figure 13:
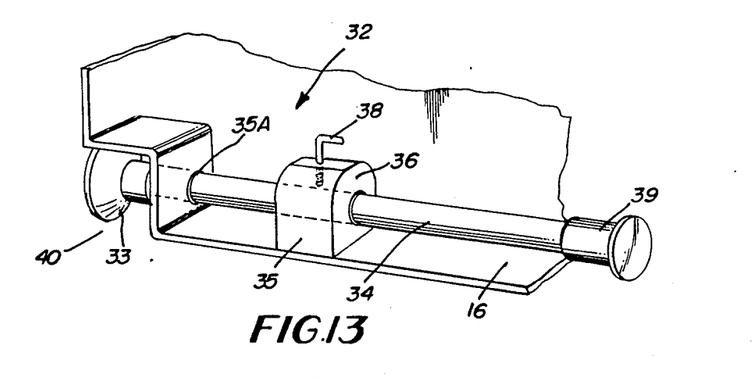
FIG. 13 is a fragmentary front perspective view of the left lock rod mechanism for the front securing system.
Figure 13A:
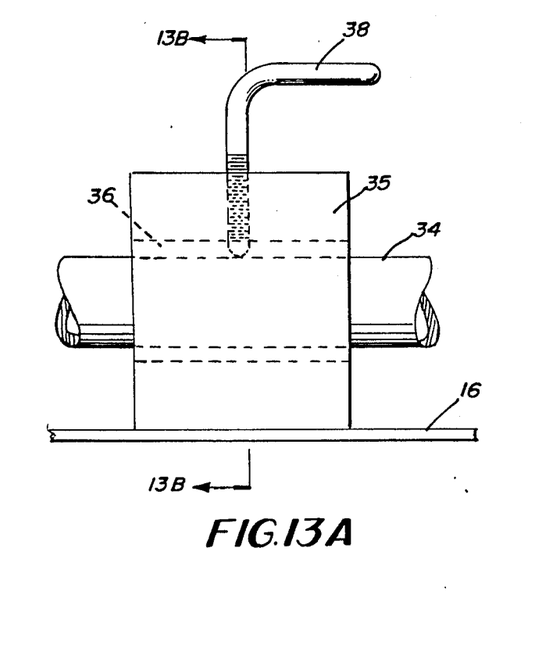
Figure 13B:
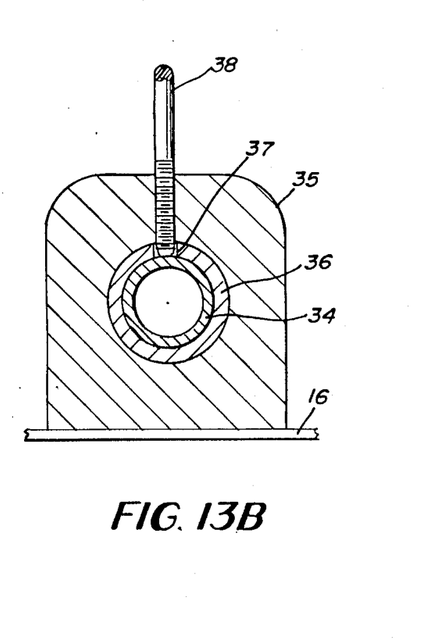
Figure 14:
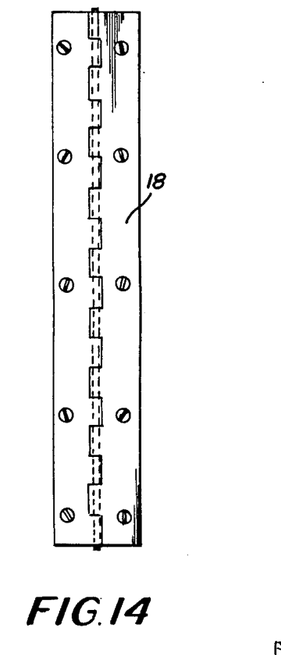
FIG 14 is a plan view of the hinge mounting assembly.
Figure 14A:
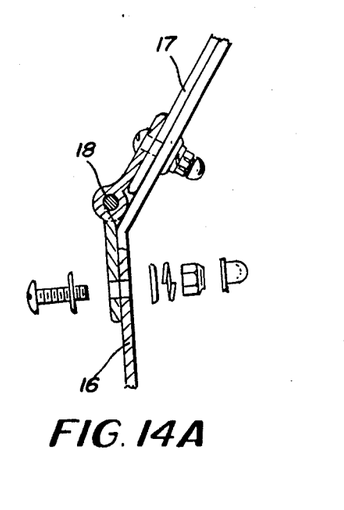

The front securing system or means 32 is located inside the compartment 16 on the left and right sides of the inside front. The front end securing system 32 elements are identical, both left and right. The front end securing system 32 comprises a rubber boot suction cup 33, a lock rod or tube 34 of sufficient length that permits extention to include various widths of side bed walls of different makes and models of pickup trucks, yet retract into the compartment 16 sufficiently to allow removal from, or placement into a pickup truck bed. Tube 34 is held in place securely by the front tube assembly mounting element or slide bearing 35 and is held tightly in place by a sleeve 36 that has a threaded opening centered at the notched area 37, at the apex end of the front tube assembly mounting element 35. Openings are located on both sides of the compartment 16, in the recessed area 40 for housing the front rubber boot suction cup 33 and the openings are surrounded by a rubber gasket seal 35-A, as shown in FIG. 13, which provides a watertight seal. A setscrew member in the form of an "L" shaped tap screw 38 threaded on one end is screwed into the sleeve 36 until it seats against tube 34. The tube 34 moves freely left and right parallel with the inner front wall of the storage device, and may be positioned to the left or to the right by grasping the front tube end rubber gripper or push member 39 at the opposite end of tube 34 from the front rubber boot suction cup 33. With the storage device centered on the centering marks provided, by simply pushing the tubes 34 located left and right outwardly until they rest against the inner wall of the bed of the pickup truck, while the "L" shaped tap screw 38 is loosened, then exerting sufficient pressure by hand on the front tube rubber gripper 39 until the front rubber boot suction cup 33 seats firmly against the inner surface of the side wall of the bed of the pickup truck. This action is repeated on the opposite front end securing system 32. When removing the storage device from, or when installing it in, the pickup truck bed, again looking from the tailgate angle, the front end securing system 32 should be retracted fully into the recessed area 40 for housing the front rubber boot suction cup 33.

The front recessed hand hold area 41 is located in the middle of the outer front wall of the storage device compartment 16. The front recessed hand hold area 41 is best fabricated as part of the whole of the compartment 16. The front recessed hand hold area 41 makes it easy when removing or installing the storage device in the pickup truck bed.

Figure 10:
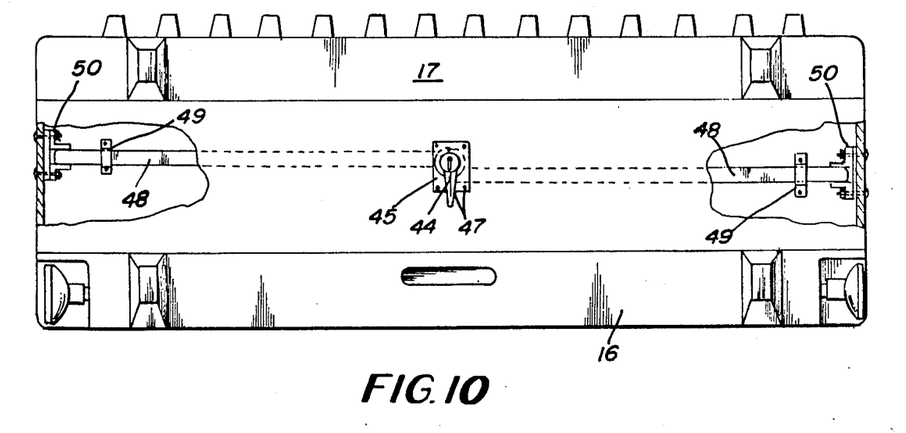
FIG. 10 is a front elevational view of the storage device and the front end locking with portions broken away mechanism.
Figure 12:
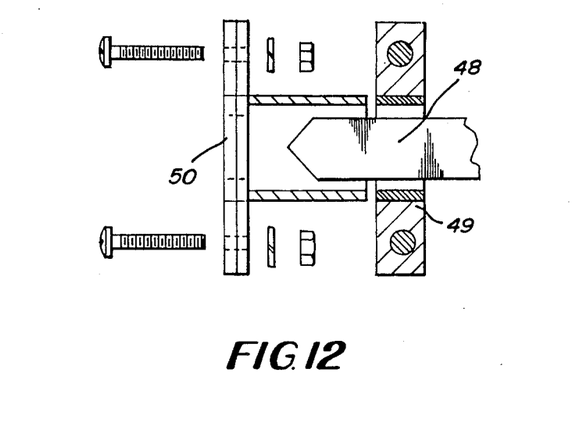
FIG. 12 is an exploded section of the front end locking mechanism, taken along line 12—12 of FIG. 12-A.
Figure 12A:
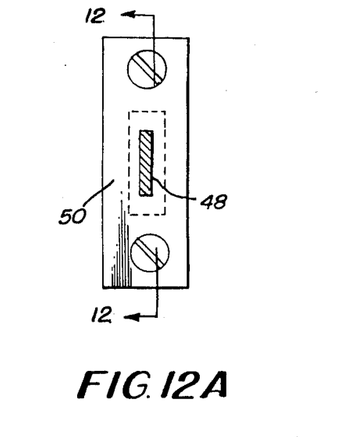

The raised feet 42 located on both the left and the right, with two raised feet 42 on the lid 17 and two raised feet 42 on the left and right of the compartment 16, provide three functions for the storage device. The raised feet 42 help with installation and positioning of the storage device. When inserted into the pickup truck bed, and with the tailgate of the pickup truck closed, the raised feet 42 should be almost touching the inside wall of the pickup truck tailgate. The raised feet 42 also aid in keeping the lock handle 44 of the front end locking mechanism 43 from being damaged when closing the tailgate of the pickup truck. Finally, the raised feet 42 permit the storage device to be carried like a large suitcase, when not in the pickup truck bed, using the handle 15 located at the rear end of the storage device, and sat down in a suitcase like fashion when and where desired. The front end locking mechanism 43 provides a secure means of holding the lid 17 down in a locked manner as to protect the contents from all outside elements and secures the lid 17 to the compartment 16 at the front end of the storage device. The front end locking mechanism 43 is locked and unlocked with a key 31. All locks are keyed to the same keys 31 for convenience, and includes padlocks 30 and the lock mounted in the lock handle 44. The handle 44 attaches to the outside plate and rubber seal 45 and the mechanical locking assembly flat sided lock handle spindle 46A is inserted into the centered opening of the outside handle assembly 47 which comprises the lock handle 44, outside plate and rubber seal 45, with appropriate bolts. Attached by the same bolts as the outside handle assembly 47, is the mechanical locking assembly 46 which attaches on the inside of the lid 17, aligned with the outside handle assembly 47. The appropriate bolts and flat sided lock handle spindle 46A fit into the corresponding openings drilled for the four bolts and the flat sided lock handle spindle 46A, thus securing both the outside handle assembly 47 and the inside mechanical locking assembly 46 to the lid 17. The mechanical locking assembly 46 has two flat metal arms 48 attached by appropriate pins, one on the left side and one on the right side. The flat metal arms 48 extend outwardly left and right along the front inside wall of the lid 17 with the outermost ends of the flat metal arms 48 being held in place by two flat metal arm stabilizer bracket 49. The flat metal arm stabilizer brackets 49 are located on the front wall, inside the lid 17 on the left and right corners. The flat arms 48 ends are extended into the flat metal arm receiving elements 50 when the lock handle 44 is in a vertical position, perpendicular to the plane. When the lock handle 44 is rotated to the left so the lock handle 44 is in a horizontal position to the plane, the flat metal arms 48 are withdrawn from the flat metal arm receiving elements 50 and the lid 17 can be opened. To reverse the process and secure the lid 17, the lock handle 44 is again placed in a vertical position, then locked with the key 31 if desired. Both the flat metal arm stabilizer brackets 49 and the flat metal arm receiving elements 50 are secured to the lid 17 and compartment 16 respectively with the appropriate bolts.

Figure 9:
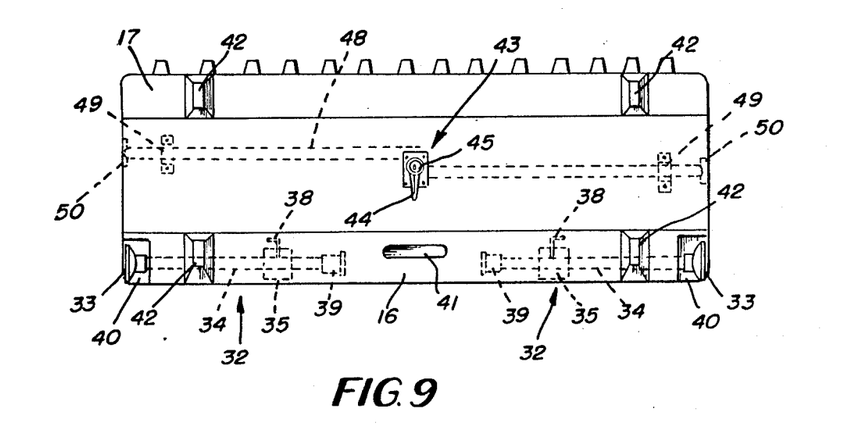
FIG. 9 is a front view of the storage device.
Figure 9A:
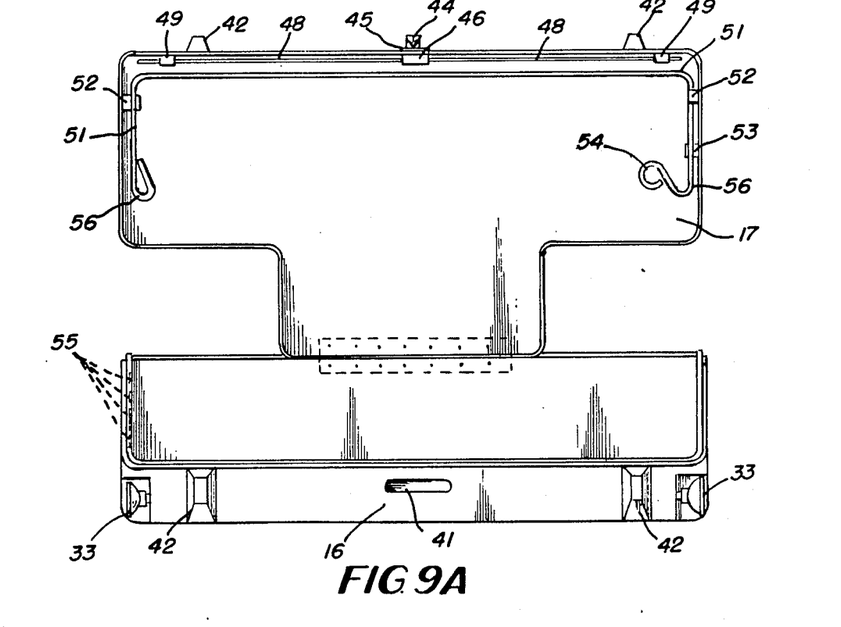
Figure 9B:
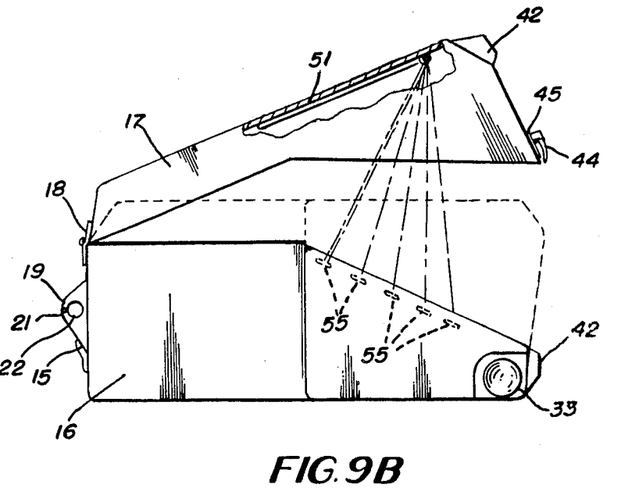

Attached to the lid 17 is the metal rod lid positioner 51 located at the front inside of the lid 17, (FIG. 9-A). The purpose of this metal rod lid positioner 51 is to allow the lid 17 to be opened to several different positions giving several different angles to the plane of the horizon. The metal rod lid positioner 51 is flat across the front of the lid 17 on the inside front and bends at right angles or perpendicular at both the left and right sides. On each side near the front inside, on the lid 17, metal rod lid positioner swivel brackets 52 are attached through the openings provided in the lid 17 with appropriate bolts, two for each metal rod lid positioner swivel bracket 52. The metal rod lid positioner swivel brackets 52 are welded to the metal rod lid positioner 51 at the point on the rod 51 just perpendicular to the plane on the horizon. This attachment bracket 52 permits the metal rod lid positioner 51 to be placed in the storage position, held in place by the metal rod retention clamp bracket 53 located on the right side of the lid 17 a few inches rearward from the metal rod lid positioner swivel bracket 52. Using the finger ring assistive area 54, located on the right side of the metal rod lid positioner 51, the metal rod ends 56 can then be lowered into one of the several compartment notches 55 located on the front top of the ledge of the compartment 16, permitting varied opened positions of the lid 17.

Figure 11:
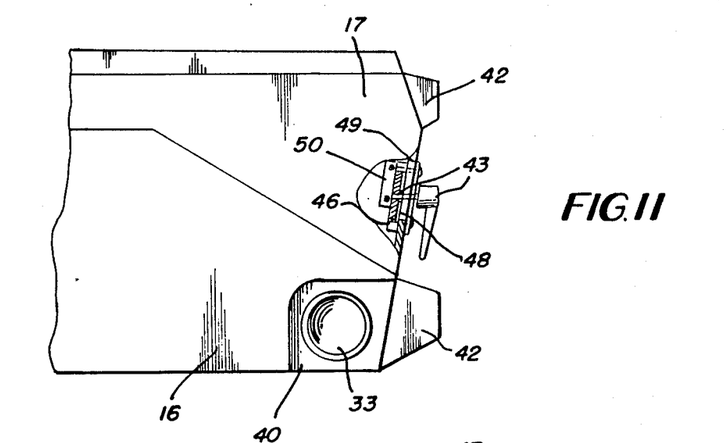
FIG. 11 is a fragmentary end elevational view of the front portion of the storage device, with portions broken away.
Figure 11A:
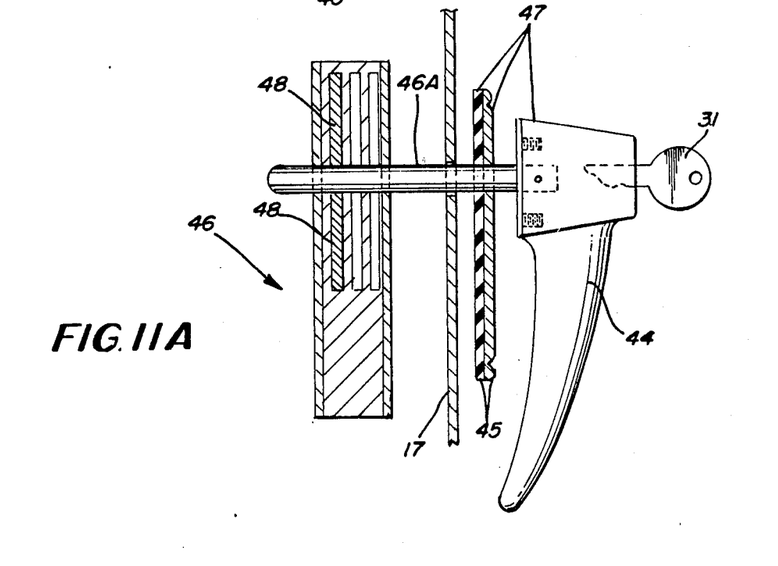

Finally, FIG. 11-A illustrates a cross section of the mechanical locking assembly 46 and the outside handle assembly 47. The two mount with four appropriate bolts to lid 17, and the outside plate and rubber seal 45 mounts to the lock handle 44 with two appropriate bolts to form the outside handle assembly 47. When in place the mechanical locking assembly flat sided lock handle spindle 46A attaches to the lock handle 44 and extends through the proper opening in the lid 17 and into the slot provided in the mechanical locking assembly 46, permitting the left and right flat metal arms 48 to be extended into or retracted from the flat metal arm receiving elements 50 by unlocking the lock handle 44 with the proper key 31 and rotating the lock handle 44 by turning it clockwise until it stops rotating. To lock the lid 17 to the compartment 16, reverse the process by rotating the lock handle counter clockwise until it stops rotating and the lock handle is vertical. The storage device can then be locked with the key 31, and the device is secured.

I claim:

1. A storage device for a pickup truck bed having a bottom bed wall and opposed side bed walls projecting upward from the bottom bed wall, comprising:
    (a) a compartment element having a longitudinal rear wall, a longitudinal front wall and opposed first and second end walls and an open top, said compartment element being adapted to be received on the bottom bed wall of a pickup truck bed with said longitudinal rear and front walls extending transversely of said bed between said side bed walls, in an operative position;
    (b) a lid element having a rear panel, a front panel, opposed first and second end panels, a top panel, and an open bottom,
    (c) hinge means connecting said rear panel to said rear wall to permit said lid element to swing between a closed position engaging said compartment element to enclose the inside space between said compartment element and said lid element, and an open position away from said compartment element;
    (d) rear securing means comprising an elongated mounting tube having opposite open ends and fixed longitudinally on said rear wall, first and second elongated lock shafts telescopingly received within said mounting tube and having free ends projecting from said opposite ends, gripping means on each of said free ends to securely grip the corresponding opposite side bed walls of a pickup truck in said operative position, and spring means normally biasing said lock shafts outward from said mounting tube toward engagement with the opposite side walls;

(e) front securing means comprising first and second slide bearings mounted inside said front wall adjacent said corresponding opposite end walls, a first lock rod having a free end slidably received in said first slide bearing for longitudinal movement transversely of said first end wall, a second lock rod having a free end slidably received in said second slide bearing for longitudinal movement transversely of said second end wall, gripping means on said free ends of said lock rods, said lock rods being slidably movable between a locking position projecting transversely from the outside of said end walls in which said gripping means engage the opposite side bed walls in said operative position, and a retracted unlocked position;

(f) rod securing means for holding said lock rods in said operative positions; shaft lock means for locking said lock shafts in various positions protracting from said mounting tube; and (g) lock means for securing said lid element to said compartment element in said closed position.

2. The invention according to claim 1 further comprising a recessed area within each of said end walls in axial alignment with each of said lock rods, each of said recessed areas being large enough to receive the free end of said corresponding lock rod in said retracted unlocked positions.

3. The invention according to claim 1 in which said gripping means on each of the free ends of said corresponding lock rods comprises a suction cup.

4. The invention according to claim 3 in which said gripping means on each of said free ends of said lock shafts comprise suction cups.

5. The invention according to claim 1 in which said rod securing means comprises setscrew means in said first and second slide bearings adapted to engage and disengage said corresponding lock rod.

6. The invention according to claim further comprising pusher means on the opposite end of each of said lock rods from said corresponding free ends to permit manual thrusting of said lock rods transversely outward from said corresponding end walls.

7. The invention according to claim 1 in which each of said lock shafts is tubular, one of said lock shafts being telescopingly received in said other lock shaft and both of said lock shafts being telescopingly received in said mounting tube.

8. The invention according to claim 7 in which said spring means comprises a coil spring within the outer end portion of each of said tubular shafts, stop means in the ends of each of said tubular shafts limiting the outward movement of each of said coil springs, and the opposite ends of each of said coil springs bearing against the adjacent ends of said other tubular shaft to bias said tubular shafts away from each other.

9. The invention according to claim 1 in which the truck bed receiving said storage device includes a pair of opposed wheel wells extending inwardly into the truck bed and spaced forwardly of the tailgate, said compartment element and said lid element having a front portion of a length substantially as great as the width of the truck bed receiving said storage device, and a rear portion having a length substantially less than the length of said front portion and less than the distance between the wheel wells in the truck bed receiving said storage device, the width of said front portion being slightly less than the distance between the wheel wells and the tailgate of the truck bed, whereby said storage device may be received in the rear area of the truck bed facing the tailgate, said rear portion extending between the wheel wells of the truck bed in said operative position.

10. The invention according to claim 9 in which the height of said rear portion is substantially uniform, and the height of said end walls of said front portion gradually declines forward from said rear portion.

* * * * *